Patented July 10, 1951

2,560,148

UNITED STATES PATENT OFFICE 2,560,148

WAX EMULSION

Karekin G. Arabian, El Cerrito, Calif., assignor to Shell Development Company, San Francisco, Calif., a corporation of Delaware No Drawing. Application February 8, 1949, Serial No. 75,313

6 Claims. (Cl. 106—271)

This invention relates to a novel composition of matter and in particular to improved emulsions of wax, finding particular application in metal rolling and the like.

The novel composition also finds application as floor, leather and furniture polishes of the paste type. Another feature of the invention resides in the novel method for preparing an aqueous emulsion of said wax.

Emulsions or dispersions of the character referred to have heretofore been prepared in which emulsifying or dispersing agents of numerous types have been utilized. While the stability of these emulsions is enhanced by the addition of various combinations of such agents, still, in many instances, the improvements have not been sufficiently marked so as to provide a completely satisfactory solution to the problems confronting those versed in the art.

Wax emulsions have been prepared, for example, using alkanol amines and their derivatives and amine salts of monobasic and dibasic carboxylic acids. It has been found, however, that such emulsions are not satisfactorily stable toward temperature changes and, hence, tend to coagulate or separate when subjected to alternate heating and cooling periods. Moreover, wax emulsions containing amine salts of carboxylic acids, such as acetic acid, produce emulsions which are too fluid for many purposes, as well as lacking thermal stability.

It is an object of the present invention to provide wax emulsions having fine grain structures and improved thermal stability. It is another object of this invention to provide wax compositions which are readily emulsifiable in economically and commercially available aqueous media. Other objects will become apparent during the following discussion. Now, in accordance with this invention, it has been found that hydrocarbon waxes containing a minor proportion of wax-soluble aliphatic amines are readily emulsifiable in aqueous solutions of hydroxy polycarboxylic acids. Still, in accordance with this invention, it has been found that emulsions of this character containing a substantial excess of said acids resist thermal changes and remain emulsified over substantial stirring periods.

The waxes to which the present invention applies include especially those having carbon contents from about 16 to about 40 carbon atoms in the wax molecule. These include both hard and soft petroleum waxes of the paraffin wax type, as well as microcrystalline waxes usually having a higher number of carbon atoms per molecule. Since the invention has been found to be applicable to both paraffin waxes and microcrystalline waxes, it is evident that any hydrocarbon waxes may be employed regardless of whether the carbon atoms are arranged in straight chain, branched chains or in cyclic configurations. The particular waxes suitable for a given purpose are well known to experts in the art. Burma wax having a range of 22 to 36 carbon atoms per molecule has been employed, as well as paraffin waxes having a melting point of 125°–127° F. and containing hydrocarbon chains having 18 to 28 carbon atoms.

In order to produce heat stable emulsions, the final composition must contain some free hydroxy polycarboxylic acid in addition to the salt of said acid with a wax-soluble aliphatic amine. This combination of wax emulsifying or stabilizing agents may be formed in situ or may be prepared prior to its use in wax or wax emulsions. A prepared process comprises incorporating the aliphatic amine, such as octadecylamine, in the wax and subsequently adding the mixture with agitation and heating to a solution of the hydroxy polycarboxylic acid in water. Dependent upon the use for which the emulsion is intended, the water content may vary within relatively wide limits. Hence, the wax may vary from less than about 1% to as much as 70% of the total emulsion.

Wax emulsions intended for use in the coating of citrus fruits will ordinarily contain as little as .2% to as much as about 20% wax. Emulsions intended for use in the cold rolling of metals should ordinarily contain higher amounts of wax varying from about 30 to about 60% wax, based on the total emulsion.

The hydroxy polycarboxylic acids intended for use in the subject compositions are few in number and comprise principally citric, tartaric, tartronic, malic, saccharic, oxal-acetic and mesoxalic acid hydrate, as well as their water-soluble acidic derivatives or substitution products. The original hydroxy polycarboxylic acid content based on the wax is preferably from about 1% to about 10% and is still more preferably originally dissolved in the water with which the wax is to be emulsified.

The aliphatic wax-soluble amines may be primary, secondary or tertiary amines, preferably having a carbon content between about 18 and 36 carbon atoms. The amines must contain at least one wax solubilizing group, and it has been found that the best results are obtained if the amine contains at least one alkyl group having at least 18 carbon atoms. Furthermore, it has been established that the most stable wax emulsions are derived from those containing a wax-soluble amine having at least one alkyl group not greater nor less than about 6 carbon atoms in length than that of the average wax molecule present in the composition. The reason for this critical factor is unknown, but it has been established that waxes having an average atom content of 24 carbon atoms per molecule show maximum emulsion stability when the amine employed is one having an alkyl group bearing from about 18 to about 30 carbon atoms. The primary alkyl amines have been found to be especially satisfactory for this purpose. Primary amines, such as hexadecylamine, octadecylamine, and amines having longer alkyl radicals are prepared. Mixtures of such amines may be employed if they are available. Secondary amines suitable for use in the present compositions include amines having at least one radical of 18 carbon atoms in length and another radical having from 1 to 30 carbon atoms. Methylheptadecylamine and its monologs, such as ethyloctadecylamine, are examples. Tertiary amines may be used if desired, such as dimethyloctadecylamine and methyldihexadecylamine. The most suitable emulsions have been obtained by using from 1 to 10% of the amine, based upon the weight of the wax.

The proportion of amine and acid must be adjusted so that free hydroxy polycarboxylic acid is present at all times during the life of the emulsion; hence, the relative amounts of acid and amine should be originally adjusted so that there are at least 4 carboxylic groups for every amino group present. While the proportion of carboxyl groups to amine groups may be varied within substitution limits, there appears to be no valid excuse for employing excessive amounts of acid beyond the ratio of about ten carboxyl groups for every amino group in the composition.

The means by which emulsions of wax are prepared are well known to experts in the art. A typical preparation is as follows:

Ten parts of a paraffin wax having a melting point of 145°–150° F. and .4 part of octadecylamine were melted at 80°–100° C. This mixture was incorporated in eight parts of water having dissolved therein .3 part of citric acid while heating at about 90° C. The mixture was emulsified by subjecting to rapid stirring and passage through a colloid mill. A similar preparation was made employing tartaric acid in place of citric acid, substantially the same proportion of tartaric acid being employed. The wax emulsions so prepared were cooled to about room temperature and then re-heated to a temperature of about 80° C. without their exhibiting any disintegration of coalescence. However, when similar emulsions were prepared by the use of dicarboxylic acid, such as maleic, oxalic or succinic acids or by the use of acetic acid, the emulsions which resulted were fluid in character and broke when heated to about 80° C.

It appears that the amine forms a salt with a portion of the hydroxy polycarboxylic acid present in the aqueous phase. The exact nature of this salt has not been established, but based upon the relative amounts found to be most effective, it would appear that the salt of the amine would, on the average, contain at least one and sometimes two free carboxyl groups for every carboxyl group which is in the salt form. Hence, when citric acid and octadecylamine are the agents employed and the ratio is about four carboxyls to every amino group, it appears to be reasonable to assume that the principal salt existing in the composition is one having a molar ratio of 1:1 between the amine and acid. It is possible that upon long standing or sufficient heating below the boiling point of water that a certain amount of amide formation occurs, but this is not believed to be the case to any appreciable extent when the degree of heating is relatively low and for a moderate period of time.

The subject compositions may contain modifying agents, such as anti-corrosion agents, and other emulsion modifiers or stabilizers. The compositions containing from about 30 to about 60% wax have been found to be especially suitable for the cold rolling of aluminum.

The invention claimed is:

1. A wax emulsion comprising a hydrocarbon wax, water, a water-soluble aliphatic hydroxy polycarboxylic acid and a salt of said acid with hexadecyl amine, the amine being present in an amount between 1 and 10% by weight of said wax, and the acid in free and salt form being present in an amount to provide from 4 to 10 carboxyl groups for each amine molecule.

2. A wax emulsion comprising a hydrocarbon wax, water, citric acid and a salt of citric acid with octadecyl amine, said amine being present in an amount between 1 and 10% by weight of said wax and the citric acid in free and salt form being present in an amount to provide from 4 to 10 carboxyl groups for each amine molecule.

3. A wax emulsion comprising a hydrocarbon wax, water, a water-soluble aliphatic hydroxy polycarboxylic acid and a salt of said acid with a wax-soluble primary alkyl amine, the amine being present in an amount between 1 and 10% by weight of said wax and the acid in free and salt form being present in an amount to provide from 4 to 10 carboxyl groups for each amine molecule.

4. A wax emulsion comprising a hydrocarbon wax, water, a water-soluble aliphatic hydroxy polycarboxylic acid and a salt of said acid with a wax-soluble aliphatic amine, the amine being present in an amount between 1 and 10% by weight of said wax and the acid in free and salt form being present in an amount to provide from 4 to 10 carboxyl groups for each amine molecule.

5. A wax emulsion comprising a hydrocarbon wax, water, tartaric acid and a salt of said acid with a wax-soluble primary alkyl amine, the amine being present in an amount between 1 and 10% by weight of said wax and the acid in free and salt form being present in an amount to provide from 4 to 10 carboxyl groups for each amine radical.

6. A wax emulsion comprising hydrocarbon waxes having from 16 to 40 carbon atoms in each wax molecule, a water-soluble aliphatic hydroxy polycarboxylic acid and a salt of said acid with a wax-soluble aliphatic amine bearing an alkyl radical whose carbon atom content is within 6 atoms of that of the average wax molecule, the amine being present in an amount between 1 and 10% by weight of said wax and the acid in free and salt form being present in an amount to provide from 4 to 10 carboxyl groups for each amine radical.

KAREKIN G. ARABIAN.

REFERENCES CITED

The following references are of record in the file of this patent:

UNITED STATES PATENTS

| Number | Name | Date |
|---|---|---|
| 2,094,609 | Kritchevsky | Oct. 5, 1937 |
| 2,274,807 | Rawlins et al. | Mar. 3, 1942 |
| 2,342,520 | Stickdorn | Feb. 22, 1944 |
| 2,448,626 | Schaeffer | Sept. 7, 1948 |